United States Patent
Grupp et al.

(10) Patent No.: US 7,745,297 B2
(45) Date of Patent: Jun. 29, 2010

(54) METHOD OF SUBSTRATE WITH TRANSPARENT ELECTRODES AND DEVICES INCORPORATING IT

(75) Inventors: Joachim Grupp, Enges (CH); Gian-Carlo Poli, Les Geneveys-sur-Coffrane (CH); Pierre-Yves Baroni, Colombier (CH); Estelle Wagner, Ecublens (CH); Patrik Hoffmann, Epalinges (CH)

(73) Assignee: Asulab S.A., Marin (CH)

( * ) Notice: Subject to any disclaimer, the term of this patent is extended or adjusted under 35 U.S.C. 154(b) by 0 days.

(21) Appl. No.: 12/019,083

(22) Filed: Jan. 24, 2008

(65) Prior Publication Data

US 2008/0145959 A1 Jun. 19, 2008

Related U.S. Application Data

(62) Division of application No. 10/793,657, filed on Mar. 5, 2004, now Pat. No. 7,449,732.

(30) Foreign Application Priority Data

Mar. 12, 2003 (EP) .................................. 03005615

(51) Int. Cl.
*E05B 67/06* (2006.01)
*H01L 21/02* (2006.01)
(52) U.S. Cl. ............... 438/301; 438/535; 257/E21.141; 257/E21.413
(58) Field of Classification Search .......... 257/E21.141, 257/E21.413; 438/301, 535
See application file for complete search history.

(56) References Cited

U.S. PATENT DOCUMENTS

| 4,228,534 | A | 10/1980 | Fellrath et al. |
| 5,424,244 | A * | 6/1995 | Zhang et al. ................. 438/301 |
| 6,414,728 | B1 | 7/2002 | Faris et al. |
| 6,489,642 | B1 | 12/2002 | America et al. |
| 6,740,807 | B2 | 5/2004 | Ono et al. |
| 2002/0024303 | A1* | 2/2002 | Sano et al. ................. 313/582 |
| 2003/0122131 | A1* | 7/2003 | Zhang et al. ................. 257/72 |
| 2004/0038138 | A1* | 2/2004 | Kiguchi et al. ................. 430/7 |

OTHER PUBLICATIONS

Wagner, Estelle, "Selective Light Induced Chemical Vapour Deposition of Titanium Dioxide Thin Films," Lausanne, 2003.

\* cited by examiner

*Primary Examiner*—Zandra Smith
*Assistant Examiner*—Tsz K Chiu
(74) *Attorney, Agent, or Firm*—Griffin & Szipl, P.C.

(57) ABSTRACT

The substrate with electrodes is formed of a transparent material onto which is deposited a film (1) of a transparent conductive material of thickness $e_1$ and of refractive index $n_1$, said film being structured to form a set of electrodes (1a) whose contours (8) delimit insulating spaces (3), wherein the insulating spaces (3) are filled with a transparent dielectric material of thickness $e_2$ and of refractive index $n_2$ so that the respective thicknesses of the conductive material and the dielectric material are inversely proportional to the values of the refractive indices of said materials and said dielectric material forms neither depressions nor beads at the contour (8) of the electrodes. A hardcoating layer (7) may be disposed between the substrate (5) and the electrodes and a protective film (9) added.

The substrate with electrodes is obtained by UV irradiation through a single mask.

14 Claims, 3 Drawing Sheets

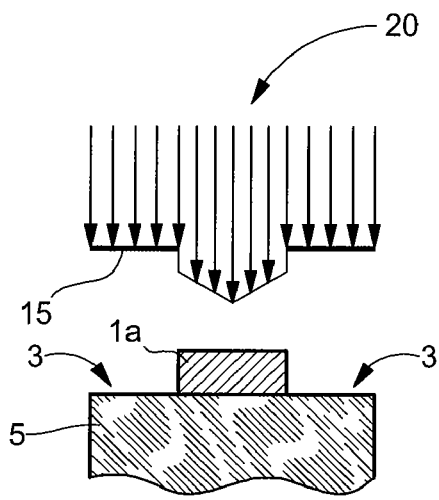
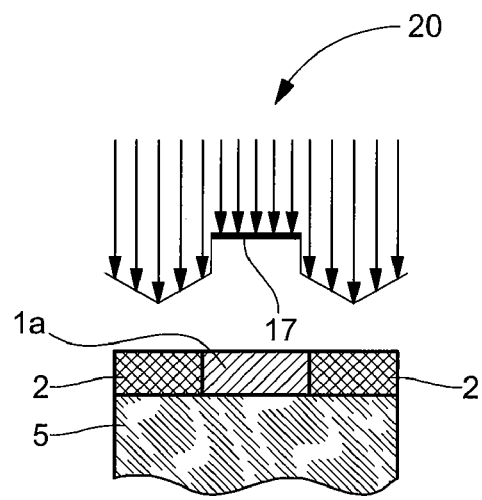
Fig.1A
(Prior art)
Fig.1B
(Prior art)
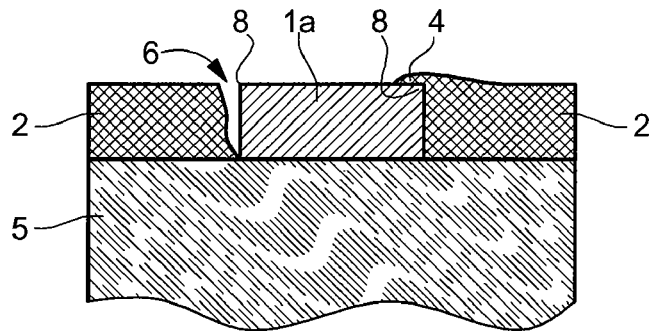
Fig.1C
(Prior art)
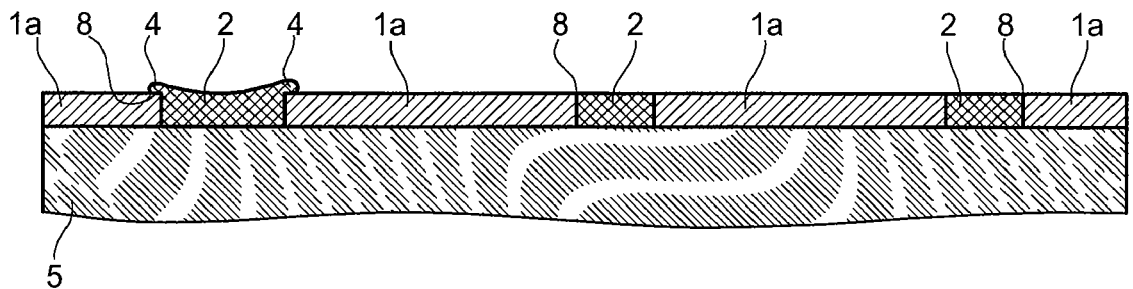
Fig.2
(Prior art)

US 7,745,297 B2

METHOD OF SUBSTRATE WITH TRANSPARENT ELECTRODES AND DEVICES INCORPORATING IT

This application is a divisional of U.S. patent application Ser. No. 10/793,657, filed Mar. 5, 2004, which claims priority on European Patent Application No. 03005615.4, filed Mar. 12, 2003. The entire disclosures of the above patent applications and hereby incorporated by reference.

TECHNICAL FIELD

The subject matter of the present invention is a transparent substrate having at least one face provided with transparent electrodes whose structure and arrangement cannot be perceived by the user in the range of wavelengths of visible light.

The invention also relates to devices including one or more substrates with transparent electrodes in which the electrodes have control or energy collector functions, and more particularly to devices of this kind disposed over the display of an electronic device when the user must be able to read the information on said display without being impeded by the structure and the arrangement of the electrodes.

The invention further relates to a method of structuring electrodes very accurately on any transparent substrate and of effecting optical compensation between the electrodes so as to make them practically invisible.

BACKGROUND OF THE INVENTION

Solutions have already been proposed to make the technical interface consisting of the electrodes as discrete as possible and not to detract from the aesthetics of the electronic device, in particular in the case of a timepiece. For example, there are prior art wristwatches in which the inside face of the glass carries touch-sensitive electrodes for controlling time functions or other functions by means of a capacitive or resistive effect, as described in a non-limiting manner in the patents U.S. Pat. No. 4,228,534, EP 0 674 247 and EP 1 207 439. The glass can also be replaced by or have added to it a cell formed of two substrates with transparent electrodes between which there is an active material, for example to form a photovoltaic cell constituting a power supply, as described in the document WO 93/19479, or to form a liquid crystal cell that can have either a transparent state or a state for displaying on demand information complementary to or different from that displayed on an underlying dial, as described in the document WO 99/32945.

Transparent conductive oxides (TCO), such as indium and tin oxide (ITO), $In_2O_3$ and $SnO_2$ doped with antimony, used in the prior art to produce the electrodes are conductive and also transparent in the visible spectrum. These materials are deposited to a thickness of 50 to 100 nm directly onto the transparent substrate or onto an intermediate layer, using any of a large number of techniques known in the art, such as spraying, evaporation, the sol-gel technique, and chemical vapour deposition (CVD) techniques, in particular the light-induced (laser-assisted) chemical vapour deposition (LICVD) technique. With regard to the structure of the electrodes, various methods used in the prior art employ at least one mask corresponding to the contour of the electrodes, either during deposition of TCO by localised crystallisation of a sol-gel film by irradiation with a UV laser or by applying to a continuous TCO film either chemical etching or localised ablation by irradiating it with UV radiation of sufficient fluence. The nature of the transparent substrate (glass or plastics material) is obviously vital from the technical and economic points of view to the choice of the process to be used. For example, localised crystallisation of a sol-gel film by a UV laser cannot be applied to a plastics material (for example PMMA) substrate, because this involves a photothermal process.

At normal incidence, a light ray passing through the TCO of refractive index $n_1$ and the substrate of refractive index $n_0$, or only the substrate, is not deflected and the electrodes are therefore invisible. On the other hand, at oblique incidence, the light path is modified, because of the different values of $n_0$ and $n_1$, with the result that the contour of the electrodes becomes visible. Obviously, it is sufficient to fill this void with a non-conductive filling material having a refractive index $n_2$ close to $n_1$. These materials are generally non-conductive transparent oxides (NCTO), such as $SiO_2$ or $TiO_2$. Various methods have been employed to achieve this objective. However, they are unsatisfactory because the filling material may form beads outside the filling area or depressions liable to modify the path of the light rays, making the contour of the electrodes even more visible, as explained below.

FIGS. 1A and 1B depict diagrammatically a prior art method using the light-induced chemical vapour deposition (LICVD) technology as described, for example, by Wagner E. (STI, Micro-engineering 2003, EPFL: Lausanne). In a first step, depicted in FIG. 1A, a transparent substrate 5 is placed in an enclosure (not shown) into which a precursor gas, for example $Sn(CH_3)_4$ or $SnCl_4$, is introduced in order to deposit a film of $SnO_2$, which is a transparent conductive oxide (TCO) which forms the electrodes 1a. This deposition is effected by the LICVD process involving irradiation through a first mask 15 which is transparent to UV radiation in areas that correspond to the configuration of the electrodes to be obtained, which are separated by insulating spaces 3.

In a second step, depicted in FIG. 1B, the first mask 15 is replaced by a second mask 17 having a window transparent to UV radiation complementary to that of the first mask. Insulating spaces 3 are filled with non-conductive filling material 2. FIG. 1C depicts defects that can arise if the two masks are not superposed in a rigorously complementary manner. Either beads 4 of NCTO or depressions 6 may be produced that lead to localised modifications of the optical path and thus render visible some portions of the contour of the electrodes 1a.

Defects of the same type may arise on filling the insulative spaces 3 with NCTO using the well-known lift-off technique. Beads 4 may then be produced on both edges 8 of the insulating space 3, as depicted in FIG. 2.

SUMMARY OF THE INVENTION

The invention therefore provides a transparent substrate carrying electrodes whose contour is invisible to a user observing said substrate at any incidence.

To this end, the invention consists in a substrate with transparent electrodes and formed of a transparent material of refractive index $n_0$ onto which is deposited a film of a transparent conductive material of thickness $e_1$ and of refractive index $n_1$. The film is structured to form a set of electrodes whose contours delimit insulating spaces adapted to be filled with a transparent dielectric material of thickness $e_2$ and of refractive index $n_2$. The substrate is characterised in that the ratio of the respective thicknesses of the conductive material and the dielectric material is inversely proportional to the ratio of the refractive indices of said materials, so that the materials form neither depressions nor beads at their junction.

In other words, the ratios n1:n2 and e1:e2 are inversely proportional to one another so that if $n_1 > n_2$ then $e_1 < e_2$ and vice versa if $n_2 > n_1$ then $e_2 < e_1$.

The transparent conductive material is preferably a transparent conductive oxide (TCO) such as indium and tin oxide (ITO), $In_2O_3$ or $SnO_2$ doped with Sb. The dielectric material is preferably a non-conductive transparent oxide (NCTO) such as $TiO_2$ and $SiO_2$.

The transparent material on which the substrate is based can be glass or a transparent plastics material such as polymethylmethacrylate (PMMA) or polycarbonate (PC). In the case of a plastics material, an intermediate layer of a hard transparent material, such as a resin incorporating $SiO_2$, is preferably disposed between the substrate and the TCO film.

The substrate as described hereinabove may further be coated with a film to protect it against mechanical attack, for example during handling to mount it in an electronic device, or against chemical attack if it constitutes a closure plate of a liquid crystal cell or a photovoltaic cell. The method of obtaining said substrate with transparent electrodes essentially consists in:

placing the substrate, previously coated with a continuous film of TCO, in a closed enclosure having a window transparent to UV radiation, a gas inlet and an outlet from which said gas is pumped;

effecting a first irradiation by a UV source through the window of the enclosure and through a mask having portions transparent to UV radiation that correspond to the insulating spaces to be formed in the TCO, the characteristics of the UV radiation being adjusted as a function of the nature and the thickness of the TCO in order to eliminate it in the irradiated areas and form said insulting spaces;

introducing a precursor gas of the NCTO into the enclosure and, using the same UV source and the same mask, effecting a second irradiation with the characteristics of the radiation adapted to the nature of the NCTO to produce a deposit of thickness $e_2$ in the insulating spaces; and pumping out the precursor gas and removing the substrate with transparent electrodes from the enclosure.

The source of UV radiation is a laser, for example a 248 nm excimer laser emitting short pulses or a 308 nm excimer laser emitting long pulses, the characteristics of the UV radiation being the fluence, the frequency and the number of pulses, all these parameters being vital for eliminating the TCO without degrading the substrate and for controlling the thickness of the NCTO deposit, as will emerge in the following detailed description.

BRIEF DESCRIPTION OF THE DRAWINGS

Other features and advantages of the present invention will become apparent in the course of the following description, which is given by way of illustrative and non-limiting example and with reference to the appended drawings, in which:

FIGS. 1A, 1B and 1C depict a prior art method and the resulting substrate carrying electrodes;

FIG. 2 depicts another substrate carrying electrodes that is obtained by another prior art method;

EMBODIMENTS OF THE INVENTION

How the invention provides perfect optical compensation to render the electrodes practically invisible to the naked eye is described hereinafter with reference to FIGS. 3, 4A, 4B and 4C.

Figure 3:
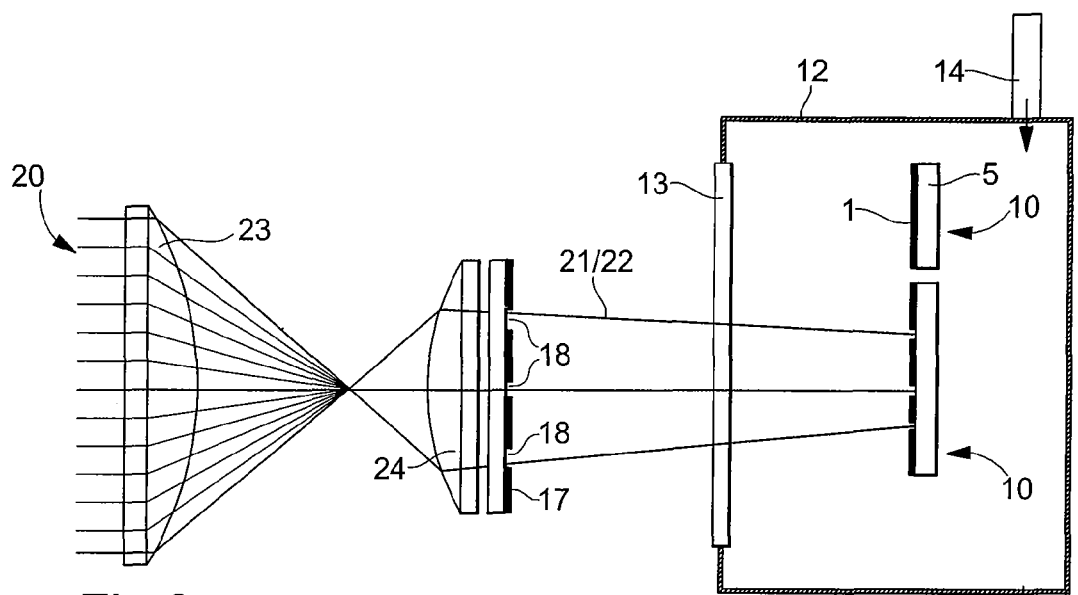
FIG. 3 is a diagram depicting a device for producing a substrate according to the invention carrying transparent electrodes.

FIG. 3 depicts diagrammatically a device which essentially comprises a laser source 20 of UV radiation, optics comprising a convergent lens 23 and a divergent lens 24 for reducing the size of the laser beam to increase its fluence, a mask 17 having areas 18 transparent to UV radiation, and an enclosure 12. The enclosure 12 has a window 13 that is transparent to UV radiation, an inlet 14 for precursor gases and an outlet 16 from which said precursor gases are pumped. The enclosure 12 may also include an additional inlet (not shown) for a vector gas for the precursor gas. A substrate 10 which, in this example, comprises a transparent base 5 already coated with a TCO film 1, is placed inside the enclosure 12. It would obviously be possible to form the TCO film directly in the enclosure 12, using the LICVD process, as indicated in the preamble, but this would be less economic.

The source of UV radiation is an excimer laser, such as an XeCl (308 nm) laser emitting long (250 ns) pulses at a maximum energy of 150 mJ per pulse with a rectangular beam $1.9 \times 2.4$ cm$^2$ or a KrF (248 nm) laser emitting short (20 ns) pulses at a maximum energy of 180 mJ per pulse with a rectangular beam $1.5 \times 4$ cm$^3$. Other excimer lasers may obviously be used.

Figure 4A:
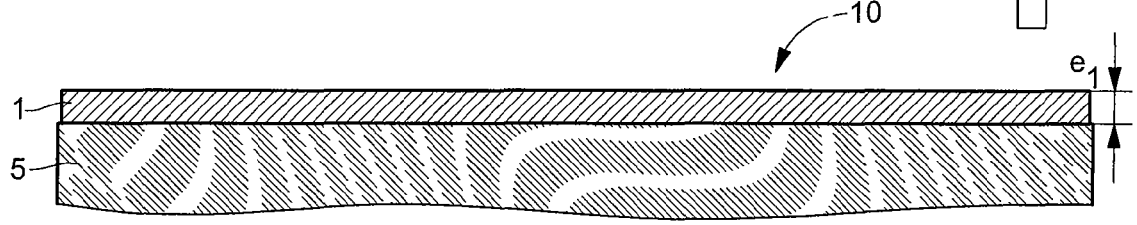
FIGS. 4A, 4B and 4C depict the steps of fabricating a substrate according to the invention carrying transparent electrodes.
Figure 4B:
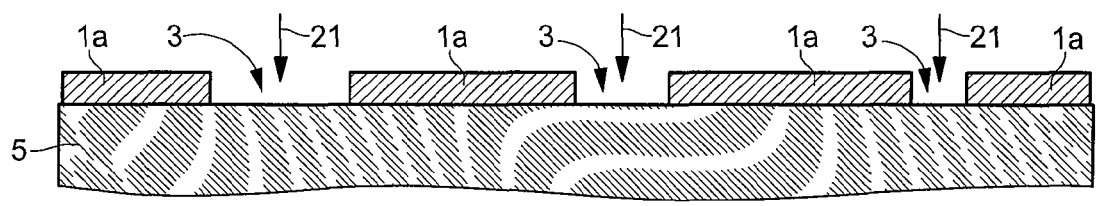
Figure 4C:
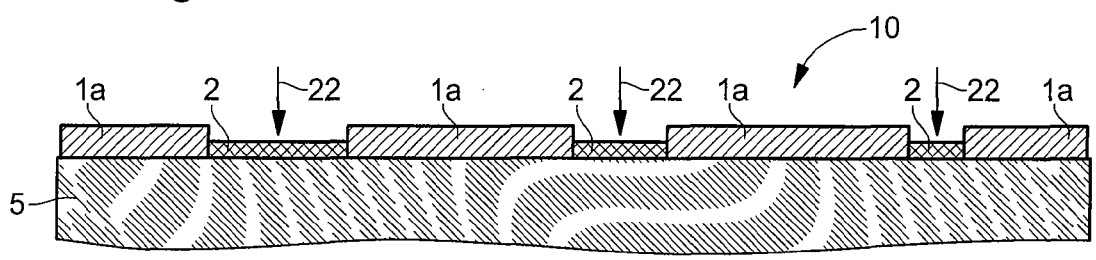

FIG. 4A depicts by way of example a glass substrate 5 onto which a continuous ITO film 1 with a thickness $e_1 = 70$ nm has been deposited. The substrate is placed in the enclosure 12 and exposed through the mask 17 to UV radiation emitted by a 308 nm excimer laser emitting long pulses. In a first step, depicted in FIG. 4B, the characteristics of the beam 21 from the laser 20 are adjusted to obtain a fluence of $\geq 300$ mJ/cm$^2$ 140 mJ/cm$^2$ and 500 pulses at 5 Hz to eliminate the ITO 1 in the insulating spaces 3 corresponding to the transparent spaces 18 in the mask 17 leaving ITO to form electrodes 1a. In a second step, depicted in FIG. 4C, retaining exactly the same mask 17 and without moving the substrate 10, titanium tetraisopropoxide (TTIP) is introduced into the enclosure 12 at a concentration of 97%, constituting a precursor gas for depositing $TiO_2$ 2 under the conditions specified by Wagner E. (already cited), and the fluence is adjusted to 60 mJ/cm$^2$ with 4 000 pulses at 20 Hz to obtain a thickness $e_2$ of $TiO_2$ 2 substantially equal to the thickness $e_1$ of ITO 1a. Under the stated deposition conditions, $TiO_2$ 2 has a measured refractive index $n_2$ of 2.05, which is substantially the same as the refractive index $n_1$ of ITO 1a, which has the value 2. The deposition phase preferably also introduces into the enclosure 12 a vector gas such as oxygen, nitrogen or a mixture of oxygen and nitrogen, to adjust the partial pressure of the precursor gas and produce a more homogeneous deposit. In the present example, the glass substrate may be replaced with a substrate of a plastics material such as PMMA, provided that the threshold fluence for degradation of the material either by ablation of the ITO or by the deposition of $TiO_2$ is not exceeded.

Figure 5A:
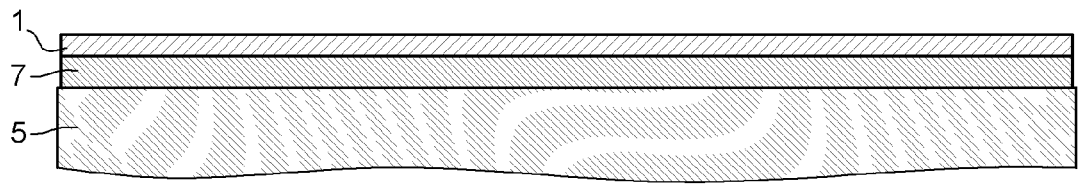
FIGS. 5A to 5E depict the steps of fabricating another substrate according to the invention carrying transparent electrodes.
Figure 5B:
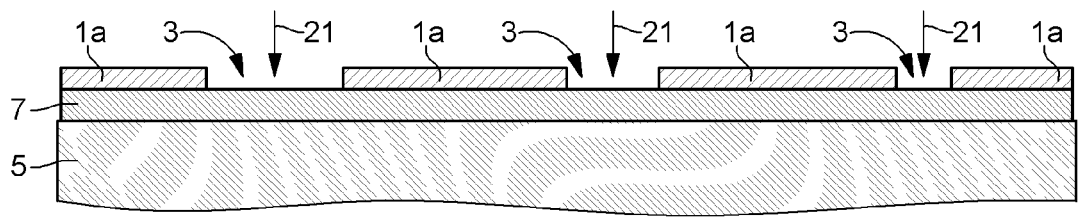
Figure 5C:
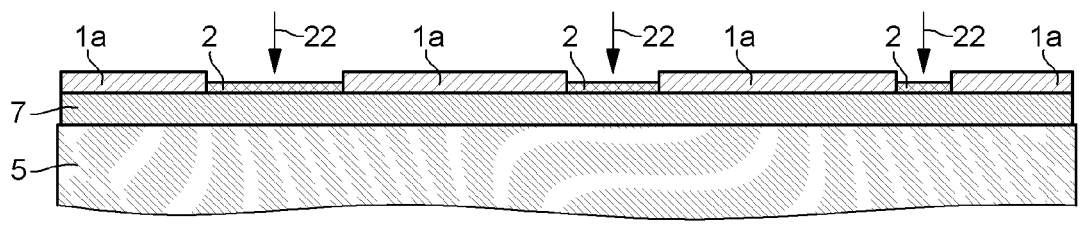
Figure 5D:
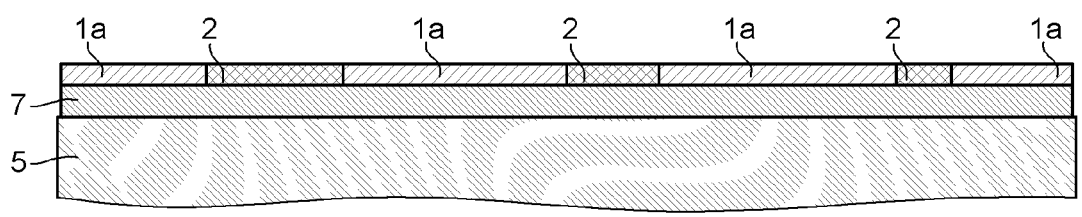

However, as explained with reference to FIGS. 5A to 5E, it has been found preferable to deposit onto the PMMA support a hard transparent intermediate layer 7 (hardcoating layer) at least 20 μm thick and onto which an ITO film 1 approximately 70 μm thick is deposited, as depicted in FIG. 5A, in which the thicknesses of the layers are not to scale. This intermediate layer, which must also have a degradation threshold fluence greater than that of PMMA, consists of a resin based on $SiO_2$, for example. It also has a mechanical function, namely improving the adhesion of the ITO layer 1 and of not being degraded in the event of deformation of the PMMA caused by increases in temperature. FIG. 5B depicts the substrate 5 after conformation of electrodes 1a separated by insulating spaces 3. In this example, the ablation of the ITO film is carried out using a 248 nm excimer laser emitting short pulses with a fluence of 80 $mJ/cm^2$ and 10 pulses at 5 Hz. In the step depicted in FIG. 5C, the deposition of $TiO_2$ 2 has begun under the same conditions as for the first example, but with the laser characteristics modified to obtain a fluence of 6 $mJ/cm^2$ with 10 000 pulses at 5 Hz. FIG. 5D depicts the same substrate at the end of depositing the $TiO_2$ 2. It can be seen that this method, in which neither the mask 17 nor the substrate 10 is moved, produces a $TiO_2$ deposit 2 that does not form either beads 4 or depressions 6 (shown in the prior art), which makes the electrodes 1a practically invisible.

Figure 5E:
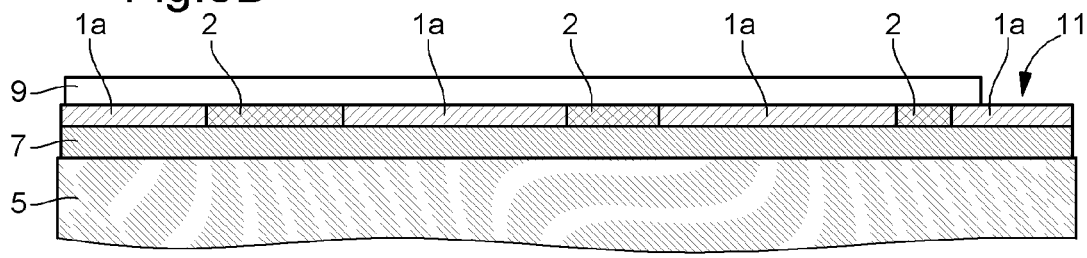

FIG. 5E depicts an optional step in which the substrate 10 remains in the enclosure 12 and is not moved but the mask 17 is replaced by a mask corresponding to the required contour of the substrate with transparent electrodes. A precursor gas for depositing a protective film 9, for example a film of $SiO_2$ and $TiO_2$, which may be modified to have anti-reflection properties, is then introduced into the enclosure, again modifying the characteristics of the laser. The film 9 also selectively delimits the areas of contact 11 of the electrodes 1a.

It is obvious that, in this second example, the PMMA may be replaced by some other transparent plastics material, such as polycarbonate (PC), the characteristics of the laser beam being adapted if necessary.

The substrate with transparent electrodes that has just been described has many applications, not only applications to touch-sensitive screens, liquid crystal cells or photovoltaic cells, but also other applications that do not depart from the scope of the present invention and will be obvious to the person skilled in the art.

The invention claimed is:

1. A method of fabricating a substrate with transparent electrodes comprising a transparent substrate on which are structured electrodes of a transparent conductive oxide (TCO) of thickness $e_1$ and of refractive index $n_1$, wherein dielectric spaces between the electrodes are filled with a non-conductive transparent oxide (NCTO) of thickness $e_2$ and of refractive index $n_2$, wherein the method comprises the following steps:
   (a) placing the substrate, previously coated with a continuous film of transparent conductive oxide, in a closed enclosure having a window transparent to UV radiation, a gas inlet and an outlet from which a first gas is pumped;
   (b) effecting a first irradiation by a UV source through the window of the enclosure and through a first mask having portions transparent to UV radiation that correspond to the dielectric spaces, wherein characteristics of the UV radiation are adjusted as a function of a property and thickness of the transparent conductive oxide in order to eliminate the transparent conductive oxide in the irradiated areas and form the dielectric spaces;
   (c) introducing a precursor gas of the non-conductive transparent oxide into the enclosure and, using the same UV source and the same first mask, effecting a second irradiation with characteristics of the UV radiation adapted to a property of the non-conductive transparent oxide to produce a deposit of thickness $e_2$ in the dielectric spaces; and
   (d) pumping out the precursor gas and removing the substrate with transparent electrodes from the enclosure.

2. A method according to claim 1, wherein fluence and frequency of the first and second irradiations are adjusted so that the thicknesses of transparent conductive oxide and non-conductive transparent oxide deposits are inversely proportional to refractive indices of the transparent conductive oxide and the non-conductive transparent oxide.

3. A method according to claim 1, wherein the precursor gas is introduced into the enclosure at the same time as a vector gas.

4. A method according to claim 1, wherein the method includes an additional step (e) of depositing a protective film from another precursor gas, using the same UV source but replacing the first mask used to structure the electrodes with a second mask corresponding to a required active surface of the substrate with transparent electrodes, leaving exposed contact areas of the electrodes.

5. A method according to claim 1, wherein the UV source is a 248 nm excimer laser emitting short pulses or a 308 nm excimer laser emitting long pulses.

6. A method according to claim 1, wherein the transparent conductive oxide is selected from the group consisting of (i) indium and tin oxide (ITO), (ii) $In_2O3$, and (iii) $SnO_2$ doped with Sb.

7. A method according to claim 1, wherein the non-conductive transparent oxide is selected from the group consisting of $TiO_2$ and $SiO_2$.

8. A method according to claim 7, wherein the $TiO_2$ is obtained from titanium tetraisopropoxide (TTIP) precursor gas.

9. A method according to claim 1, wherein prior to step (a), the substrate is previously coated with both an intermediate layer of a hard transparent material and with the continuous film of transparent conductive oxide so that the intermediate layer of hard transparent material is deposited on the substrate and the continuous film of transparent conductive oxide is deposited on the intermediate layer.

10. A method according to claim 4, wherein the protective film has anti-reflection properties.

11. A method according to claim 1, wherein the transparent substrate is made from polymethylmethacrylate or polycarbonate.

12. A method according to claim 9, wherein the intermediate layer is at least 20 μm thick and consists of a resin based on $SiO_2$.

13. A method according to claim 1, wherein the thickness e1 of the transparent conductive material is from 50 to 100 nm.

14. A method according to claim 1, wherein thickness e2 of the non-conductive transparent oxide is a function of refractive index n2 so that a light path incident upon the substrate is unmodified at any incidence of observation thereby making a contour of the transparent electrodes invisible to a user observing the substrate.

* * * * *